United States Patent [19]

Cowell

[11] 4,408,247

[45] Oct. 4, 1983

[54] HIGH VOLTAGE PROTECTION CIRCUIT FOR X-RAY SYSTEMS

[75] Inventor: David Cowell, Webster, N.Y.

[73] Assignee: Sybron Corporation, Rochester, N.Y.

[21] Appl. No.: 185,776

[22] Filed: Sep. 10, 1980

[51] Int. Cl.³ .......... H02H 3/38

[52] U.S. Cl. .......... 361/79; 378/118

[58] Field of Search .......... 361/79, 82, 84, 80; 363/59, 51; 378/117, 118

[56] References Cited

U.S. PATENT DOCUMENTS

| | | | |
|---|---|---|---|
| 3,240,998 | 3/1966 | Sonnemann | 361/80 |
| 3,683,264 | 8/1972 | Schieman et al. | 361/79 X |
| 3,746,862 | 7/1973 | Lombardo et al. | 378/118 X |
| 3,931,548 | 1/1976 | Barchok | 363/51 X |
| 4,125,773 | 11/1978 | Aldenhovel | 378/118 |

*Primary Examiner*—Reinhard J. Eisenzopf
*Attorney, Agent, or Firm*—Robert A. Gerlach; Joseph C. MacKenzie

[57] ABSTRACT

A circuit protects a high voltage supply for x-ray tubes from the damaging effects of a tube flashover or the like. The circuit monitors line current, and high voltage and reacts to an increase in line current occurring with a corresponding drop in high voltage to turn off the high voltage.

5 Claims, 1 Drawing Figure

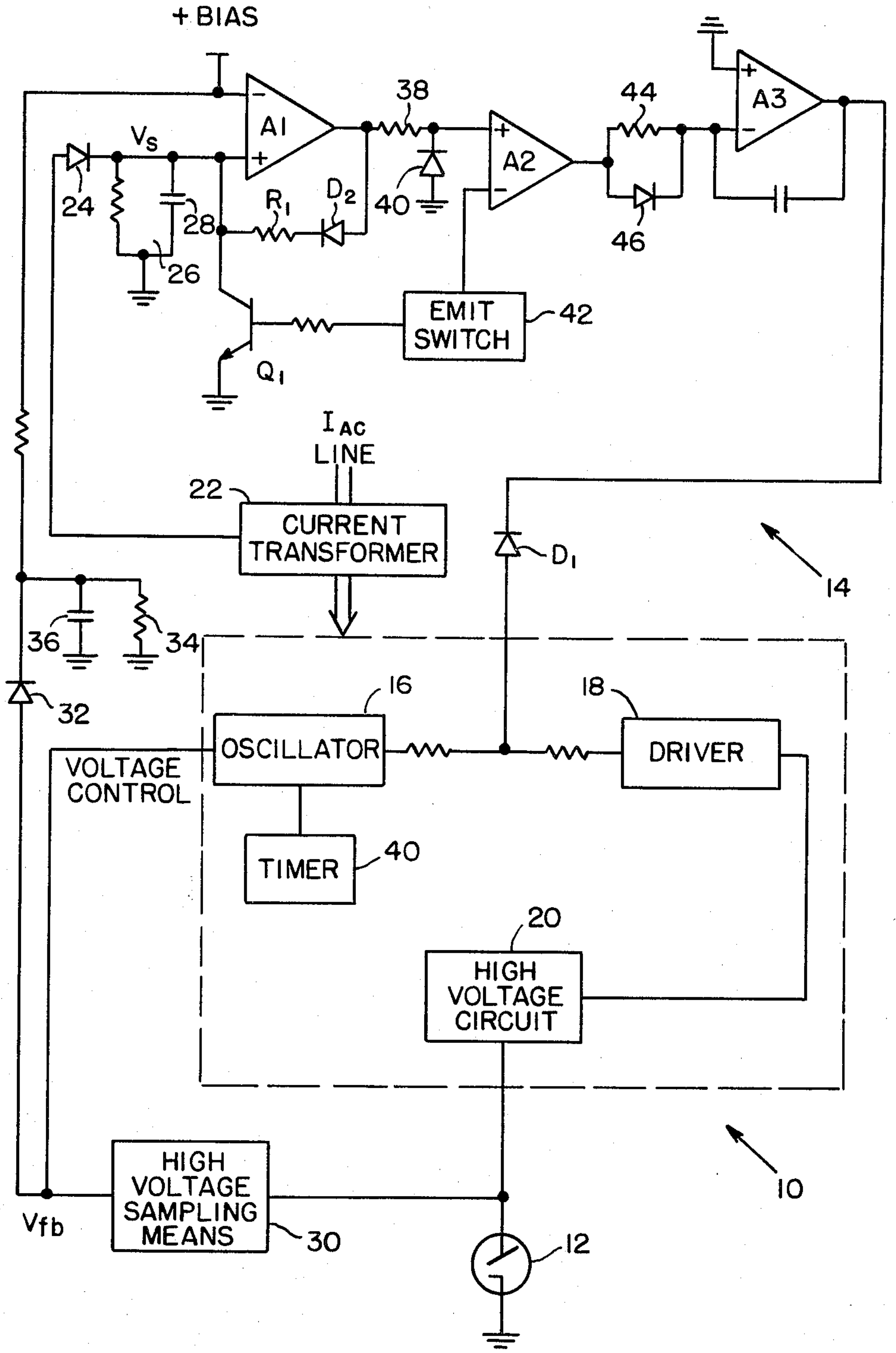
+BIAS
A1
A2
A3
38
44
Vs
24
28
26
R1
D2
40
46
EMIT SWITCH
42
Q1
IAC LINE
22
CURRENT TRANSFORMER
D1
14
36
34
32
16
18
OSCILLATOR
DRIVER
VOLTAGE CONTROL
TIMER
40
20
HIGH VOLTAGE CIRCUIT
10
HIGH VOLTAGE SAMPLING MEANS
30
Vfb
12

HIGH VOLTAGE PROTECTION CIRCUIT FOR X-RAY SYSTEMS

BACKGROUND OF THE INVENTION

This invention pertains to high voltage power supplies for x-ray tubes and more particularly is concerned with circuits for protecting said power supplies from the effects of tube flashovers or other damaging conditions.

Modern x-ray power supplies include solid state components which are damaged by high current. The present invention fulfills the need to provide rapid response to transient condition by effectively turning off the power supply before damage can occur.

SUMMARY OF THE INVENTION

Briefly, a protection circuit protects a high voltage x-ray power supply from conditions characterized by an increase in line current and a decrease in high voltage. Signals representing line current and high voltage are monitored. If the line current monitor signal becomes greater than the high voltage monitor voltage, the protection circuit turns off the high voltage from the power supply. The high voltage can be turned off by clamping a lower voltage drive signal which is normally multiplied to provide the high voltage.

BRIEF DESCRIPTION OF THE DRAWINGS

The single drawing is a schematic representation of a protection circuit embodying the invention and which is arranged with a x-ray power supply.

DESCRIPTION OF THE INVENTION

Referring to the single drawing, there is seen an example of a high voltage power supply 10 with its output connected to a x-ray tube 12. A protection circuit 14 embodying the invention is arranged with the power supply 10 to protect the supply's components should a disruptive discharge such as a tube flashover, or other transient condition occur.

The high voltage power supply includes a high frequency oscillator 16 providing a low voltage drive signal at its output. The oscillator's output is fed to a driver circuit 18 which amplifies the power of the low voltage drive signal. The amplified drive signal is then directed to the input of a high voltage circuit 20 which multiplies the amplified drive voltage, (400 volts for example) to a potential high enough to energize the x-ray tube (70 KV for example.

The high voltage circuit applies the high voltage between the cathode and plate of the tube 12.

The power supply is energized by 50 or 60 Hz line current. During normal conditions the line current used by the power supply and the high voltage at the output of the supply will be proportional to each other. In the event a fault causes a drop in the high voltage, the line current flowing to the supply will increase, possibly damaging susceptible solid state components of the supply 10.

The purpose of the protection circuit 14 is to monitor the power supply parameters of line current input and high voltage output and to respond to a fault condition by rapidly turning off the high voltage.

The amount of alternating line current into the supply may be determined by a current transformer 22 or pickup coil coupled to the current feed wire. An AC voltage is induced in the current transformer and rectified by a series diode 24 and smoothed by a shunt resistor 26 and capacitor 28. The resultant DC voltage $V_s$ is proportional to the line current ($I_{AC}$) flowing to the power supply. Under normal operating conditions, the line current monitor voltage $V_s$ is greater than 0.7 volts DC.

A voltage representing the high voltage across the x-ray tube is also needed. A voltage divider 30 samples the high voltage. The sample is smoothed by elements 32, 34 and 36 to obtain a high voltage monitor voltage $V_{fb}$ which typically is greater than $V_s$.

The line current monitor voltage $V_s$ and the high voltage monitor voltage $V_{fb}$ are compared by the protection circuit 14.

The protection circuit 14 includes two differential amplifiers A1, A2 and an integrator A3 all connected in series. Following the integrator there is a clamping diode $D_1$ which is connected between the oscillator and the driver of the power supply. The effect of the diode is dependent upon the voltage condition at the output of the integrator. The function of the diode is to clamp the drive signal to a voltage too low for the driver to operate thereby turning of the high voltage to the x-ray tube upon a fault condition.

Each differential amplifier A1, A2 has two inputs and one output. The inputs are known as inverting and non-inverting identified by a minus or plus sign respectively in the drawing. The differential amplifiers A1, A2 (as well as the integrator A3) are supplied with plus and minus 15 volts DC.

The voltage difference between the two inputs of either amplifier A1, A2 will be multiplied by the amplifier's high gain and causes the output to be saturated at either plus or minus 15 volts DC. If the voltage difference between the inverting and non-inverting inputs is positive, then the corresponding output voltage is minus 15 volts DC. Conversely, if the voltage difference is negative, the output will be at plus 15 volts DC.

The line current monitor voltage $V_s$ is applied to the non-inverting input (+) of A1.

The high voltage monitor voltage $V_{fb}$ is applied to the inverting input (−) of A1. There is also a +0.7 volt dc bias applied to the inverting input of A1. When the tube is not activated line current will be low and high voltage will be zero. A1's output is −15 volts DC when the tube is not activated because of the +0.7 volt bias.

Following the output of A1 is a resistor-diode combination 38, 40 which clamps the non-inverting input of A2 to −0.7 volts when the output of A1 is −15 volts. A positive output of +15 volts from A1 will appear unattenuated at the non-inverting input of A2.

The inverting input of A2 receives a voltage which is dependent on the status of an emit switch 42. The emit switch 42 is actuated by an operator to start exposure of x-ray emission. Before and after actuation the switch 42 puts −8 volts at A2's inverting input. During actuation, the emit switch 42 causes +2 volts to appear at A2's inverting input. There is normally −0.7 volts DC at the A2 non-inverting input so the output of A2 will change from +15 V to −15 V during actuation. The output of A2 is connected to the input of integrator A3. Integrator A3 is a differential circuit with capacitive feedback. The inverting input of $A_3$ is in series with a resistor 44 and diode 46. The non-inverting input is grounded.

Before actuation of the emit switch 42 the input to A3 is +15 volts. Actuation of the emit switch 42 causes −15 volts to appear at A3's input through resistor 44.

The input is integrated so the output is a positive sloped voltage ramp from −15 V dc to +15 dc. The output of A3 is tied to the cathode of diode D1. Anode of diode D1 is tied to the power supply 10 at the connection between oscillator 16 and drive 18.

When the output of A3 is negative, as it is before and after actuation of the emit switch 42, diode D1 is forward biased and clamps the drive signal to a low voltage insufficient to drive the driver 18. No high voltage is then produced.

During actuation of the emit switch the output of A3 is positive. Then D1 is reversed bias so all of the drive signal reaches the driver 18. The level of the driver signal is high enough to drive the driver 18 and produce a high voltage across the x-ray tube 12.

A separate timing circuit 48 turns the high voltage off after the emission of a dose of x-ray. Emission time is so short that it elapses while the emit switch is still actuated.

The protection circuit quickly turns off the high voltage in the event of a fault. Under fault conditions $V_{fb}$ drops while $V_s$ rises, changing the polarity across the inputs of A1. The outputs of A1, A2 and A3 all rapidly reverse with the net effect of forward biasing diode D1 and clamping the drive signal to a low voltage.

As the period of emission is so short that the emit switch is still actuated at its expiration it is necessary after a fault to temporarily deactivate the high voltage while the emit switch is still actuated. This helps prevent the high voltage from being turned back on while the fault condition exists.

For this purpose, a transistor, Q1, is connected as a switch between the non-inverting input of A1 and ground.

Transistor $Q_1$ is NPN so a positive base voltage turns the transistor "ON" bringing the non-inverting input of $A_1$ to about ground potential. A negative base voltage turns transistor $Q_1$ off, thus allowing a voltage to arise at $A_1$'s non-inverting input. The base voltage is controlled by the emit switch 42 which supplies a negative voltage when pressed and a positive voltage when released. Thus the non-inverting input is near ground potential when the emit switch is not being actuated.

A positive output of A1 is fedback to the non-inverting input by a diode D2 and resistor R1 in series. While the emit switch is actuated Q1 will be "OFF" allowing a positive feedback voltage to appear at the non-inverting input of $A_1$. This arrangement latches the amplifier A1 until the emit switch is released.

Table 1 tabulates voltages in the circuit during different conditions.

TABLE 1

| | DC voltages appearing in circuit during different conditions. | | | | | | | | | |
|---|---|---|---|---|---|---|---|---|---|---|
| | Base of | A1 | | | A2 | | | A3 | | HV |
| | Q1 | I | NI | Out | I | NI | Out | I | Out | Drive |
| Before Emit Switch Actuated | +2 | +0.7 | 0V | −15 | −8 | −0.7 | +15 | +15 | −15 | Low |
| After Emit Switch Actuated | −8 | $V_{fb} > V_s$ | | −15 | +2 | −0.7 | −15 | −15 | +15 | High |
| Fault During Switch Actuation | −8 | $V_{fb} < V_s$ | | +15 | +2 | +15 | +15 | +15 | −15 | Low |
| After Release Of Emit Switch | +2 | +0.7 | O | −15 | −8 | −0.7 | +15 | +15 | −15 | Low |

Having described my invention as required by 35 USC 112, I claim:

1. A protection circuit, for a x-ray power supply energized by line current of the type which multiplies a low voltage drive signal to obtain a high voltage, comprised of:

means for providing a line current monitor signal;

means for providing a high voltage monitor signal;

means for providing a first voltage if the line current monitor signal is more than the high voltage monitor signal, and a second voltage if the line current monitor signal is less than the high voltage monitor signal; and means for turning off the high voltage of the x-ray power supply in response to the first voltage.

2. The protection circuit of claim 1 wherein said means for turning off the high voltage clamps the drive signal voltage in response to the first voltage.

3. X-ray apparatus including an X-ray power supply having input means and output means, said input means being connectible to line current for energizing said power supply for causing high voltage to be available at said output means such as to cause an X-ray tube connected thereto to produce penetrating X-radiation, and the improvement comprising protection circuit means connected to said input means and said output means for monitoring said line current and said high voltage and responding to deviation from a predetermined relation therebetween signifying the existence of flashover or equivalent fault by effectively turning off said power supply before damage due to high current occurs thereto.

4. The X-ray apparatus of claim 3, whereas said deviation is due to substantially simultaneous increase of said line current and decrease of said high voltage.

5. The X-ray apparatus of claim 3, wherein there is an emit switch means which has to be actuated in order for said power supply to produce said high voltage, said line current being unable to energize said power supply unless said emit switch means is being actuated; wherein there is also timer means for independently causing said power supply to be energized by low current for a first time interval during which X-rays are to be emitted, said emit switch means when actuated staying actuated for a second time interval greater than the said first time interval; and where there is latching means which, in response to said emit switch means staying actuated, latches said power supply off while said emit switch means stays actuated.

* * * * *